(12) United States Patent
Wu

(10) Patent No.: US 10,789,327 B2
(45) Date of Patent: Sep. 29, 2020

(54) METHOD AND APPARATUS OF GENERATING AND PROVIDING PAGE OF DATA OBJECT INFORMATION

(71) Applicant: Alibaba Group Holding Limited, Grand Cayman (KY)

(72) Inventor: Xiaodong Wu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 302 days.

(21) Appl. No.: 15/831,874

(22) Filed: Dec. 5, 2017

(65) Prior Publication Data

US 2018/0157766 A1 Jun. 7, 2018

(30) Foreign Application Priority Data

Dec. 5, 2016 (CN) .......................... 2016 1 1104700

(51) Int. Cl.
| | |
|---|---|
| *G06F 16/95* | (2019.01) |
| *G06T 15/00* | (2011.01) |
| *G06T 13/20* | (2011.01) |
| *G06T 19/00* | (2011.01) |
| *G06F 16/957* | (2019.01) |
| *G06F 16/958* | (2019.01) |
| *G06T 15/20* | (2011.01) |
| *G06Q 30/02* | (2012.01) |
| *H04L 29/08* | (2006.01) |

(52) U.S. Cl.
CPC ........ *G06F 16/9577* (2019.01); *G06F 16/972* (2019.01); *G06Q 30/0241* (2013.01); *G06T 13/20* (2013.01); *G06T 15/00* (2013.01); *G06T 15/20* (2013.01); *G06T 19/00* (2013.01); *H04L 67/02* (2013.01)

(58) Field of Classification Search
CPC .............. G06F 16/9577; G06F 16/972; G06Q 30/0241; G06T 13/20; G06T 15/00
USPC ........................................................ 345/420
See application file for complete search history.

(56) References Cited

U.S. PATENT DOCUMENTS

| | | | |
|---|---|---|---|
| 7,118,226 B2 | 10/2006 | Davis et al. | |
| 2005/0257435 A1* | 11/2005 | Rottcher | ................. G09F 13/12 52/27 |

(Continued)

OTHER PUBLICATIONS

PCT Search Report and Written Opinion dated Feb. 16, 2018 for PCT Application No. PCT/US17/64644, 13 pages.

*Primary Examiner* — Hai Tao Sun
(74) *Attorney, Agent, or Firm* — Lee & Hayes, P.C.

(57) ABSTRACT

Methods and apparatuses of generating and providing a page of data object information are disclosed. A method of generating a page of data object information may include creating a three-dimensional scene by a server, the three-dimensional scene being a structure with a curved surface; determining display information of data objects, the display information including display models having three-dimensional display effects; determining respective positions of the display information of the data objects on the curved surface and respective first angles formed with the curved surface; and generating a page of data object information based on the display information, and information of the respective positions and the respective first angles of the data objects. The embodiments of the present disclosure can help improving a conversion rate of a page.

20 Claims, 16 Drawing Sheets

(56) References Cited

U.S. PATENT DOCUMENTS

| | | |
|---|---|---|
| 2009/0313584 A1 | 12/2009 | Kerr et al. |
| 2009/0323029 A1 | 12/2009 | Chen et al. |
| 2010/0020026 A1* | 1/2010 | Benko .................... G06F 3/041 345/173 |
| 2010/0153372 A1 | 6/2010 | Kim |
| 2010/0180236 A1 | 7/2010 | Lin et al. |
| 2011/0261048 A1 | 10/2011 | Lee et al. |
| 2012/0038636 A1 | 2/2012 | Montague |
| 2013/0093785 A1 | 4/2013 | Zhang et al. |
| 2014/0327676 A1 | 11/2014 | House |
| 2015/0249815 A1* | 9/2015 | Sandrew ............... G06T 15/205 348/47 |
| 2016/0267062 A1* | 9/2016 | Leow .................... G06F 3/0485 |
| 2016/0267707 A1* | 9/2016 | Vesely ................... G06T 15/20 |
| 2017/0132841 A1 | 5/2017 | Morrison |

* cited by examiner

METHOD AND APPARATUS OF GENERATING AND PROVIDING PAGE OF DATA OBJECT INFORMATION

CROSS REFERENCE TO RELATED PATENT APPLICATIONS

This application claims foreign priority to Chinese Patent Application No. 201611104700.0, filed on Dec. 5, 2016, entitled "Method and Apparatus for Generating and Providing Page of Data Object Information," which is hereby incorporated by reference in its entirety.

TECHNICAL FIELD

The present disclosure relates to the technological field of page information processing, and particularly to methods and apparatuses of generating and providing an information page of a data object.

BACKGROUND

As electronic commerce (e-commerce) transaction platforms have been developed, not only a variety of different improvements have been made in aspects such as transaction processes, inventory management, payment processes, but innovative modes have also been exploited in web page designs continuously. This is especially true during warm-up periods of large-scale promotion events such as Single's Day, pages that collect information of a number of different brands usually need to be published, to provide a better guidance and to improve access volumes of merchant pages.

In order to achieve goals such as improving an access volume of a page, existing technologies generally renovate aspects such as a banner of a page, data content displayed in the page, a layout of the page, etc. However, an actual effect thereof may not be prominent. It is because a final page generated by renovating a page only in these aspects may give a user an impression of "following the same pattern," and the user cannot obtain any feeling of freshness from the page. Therefore, it is difficult to achieve goals such as attracting the user to view, increasing a time of stay of the user in the page, etc., and is thus difficult to improve a conversion rate of the page.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method and an apparatus of generating and providing an information page of a data object, to help improving a conversion rate of the page.

The present disclosure provides technical solutions as follows.

A method of generating an information page of a data object includes creating a three-dimensional scene by a server, the three-dimensional scene being a curved structure; determining display information of data objects, the display information including a display model having a three-dimensional display effect; determining positions of the display information of the data objects in the curved structure and respective first angles formed with a curved surface; and generating an information page of the data objects based on the display information of the data objects, the positions of the display information, and information of the first angle.

A method of providing an information page of a data object includes sending a request for accessing an information page of a data object from a client to a server; and displaying the information of the data object based on page data returned from the server, wherein the information of the data object includes a three-dimensional scene, the three-dimensional scene is a curved structure, a preset position of a curved surface displays display information of the data object, the display information is a display model having a three-dimensional display effect and forms a first angle with the curved surface.

A method of providing an information page of a data object includes receiving a request for accessing an information page of a data object from a client by a server; and providing the information page of the data object, wherein the information page of the data object includes a three-dimensional scene, the three-dimensional scene is a curved structure, a preset position of a curved surface displays display information of the data object, the display information is a display model having a three-dimensional display effect and forms a first angle with the curved surface.

An information page of a data object includes a three-dimensional scene, the three-dimensional scene being a curved structure, a preset position of a curved surface displaying display information of a data object, the display information being a display model that has a three-dimensional display effect and forming a first angle with the curved surface.

An apparatus of generating an information page of a data object, which is applied in a server, includes a scene creation unit used for creating a three-dimensional scene, the three-dimensional scene being a curved structure; a display information determination unit used for determining display information of data objects, the display information including a display model having a three-dimensional display effect; a position and angle information determination unit used for determining positions of the display information of the data objects in the curved structure and respective first angles formed with a curved surface; and a page generation unit used for generating an information page of the data objects based on the display information of the data objects, the positions of the display information, and information of the first angle.

An apparatus of providing an information page of a data object, which is applied in a client, includes a request sending unit used for sending a request for accessing an information page of a data object to a server; and a page display unit used for displaying the information of the data object based on page data returned from the server, wherein the information of the data object includes a three-dimensional scene, the three-dimensional scene is a curved structure, a preset position of a curved surface displays display information of the data object, the display information is a display model having a three-dimensional display effect and forms a first angle with the curved surface.

An apparatus of providing an information page of a data object, which is applied in a server, includes an access request receiving unit used for receiving a request for accessing an information page of a data object from a client; and a page data provision unit used for providing the information page of the data object, wherein the information page of the data object includes a three-dimensional scene, the three-dimensional scene is a curved structure, a preset position of a curved surface displays display information of the data object, the display information is a display model having a three-dimensional display effect and forms a first angle with the curved surface.

According to exemplary embodiments provided in the present disclosure, the present disclosure discloses the following technical effects.

The embodiments of the present disclosure make a breakthrough in conventional methods of displaying a page of a data object. The embodiments of the present disclosure no longer adopt a page design method in a two-dimensional surface, but implement a page having a three-dimensional effect. In other words, an object displayed in a page is no longer displayed in a two-dimensional surface, but has a three-dimensional display effect. Apparently, if pages in a sales platform are designed in a three-dimensional manner, the pages can obtain a more fashionably impressive display effect, and allow users to obtain shopping experience more similar to shopping offline stores in reality. This therefore helps improving a conversion rate of pages.

Furthermore, when a page of a data object is generated, a three-dimensional scene that is implemented may possess a rotating structure. By adjusting a circumference of rotation, the circumference of rotation can be made to be an arc length of a portion of a curved surface displayed by each screen of a terminal device, e.g., may be four times. A preconfigured display model of the data object is placed in the three-dimensional scene to generate the information page of the data object. According to a rule of "small when near, large when afar" in the three-dimensional world, a strategy of "one circumference=four screens" can therefore manifest a more realistic three-dimensional feeling, and ensure a single screen to display an angle of 90°. Since 90°-110° are relatively reasonable angles of capture for a three-dimensional camera, this approach can also ensure display models in the three-dimensional scene to face towards a user. In short, a three-dimensional display effect can be ensured, while a sufficient degree of exposure of information is also guaranteed.

Furthermore, when the page is moving, a first angle between a display model and a curved surface can be adjusted to cause an angle between the display model and a direction of view of a user to be maintained within a certain angular range, thereby ensuring the effectiveness of data released from the page.

Apparently, any product implementing the present disclosure does not need to achieve all the above advantages at the same time.

BRIEF DESCRIPTION OF THE DRAWINGS

In order to describe the embodiments of the present disclosure more clearly, accompanying drawings that are needed by the embodiments are briefly described herein. Apparently, the described drawings merely represent some embodiments of the present disclosure. Based on these drawings, one of ordinary skill in the art can obtain other drawings without making any creative effort.

FIGS. 8-1-8-3 show schematic diagrams of a first page moving process in accordance with the embodiments of the present disclosure.

FIGS. 9-1 and 9-2 show schematic diagrams of a second page moving process in accordance with the embodiments of the present disclosure.

DETAILED DESCRIPTION

Technical solutions in the embodiments of the present disclosure are described in a clear and comprehensive manner in conjunction with the accompanying drawings in the embodiments of the present disclosure. Apparently, the described embodiments merely represent some and not all of the embodiments of the present disclosure. Based on the embodiments in the present disclosure, other embodiments that are obtained by one of ordinary skill in the art fall in the scope of protection of the present disclosure.

In the embodiments of the present disclosure, a breakthrough in conventional methods of displaying a page of a data object is made. The embodiments of the present disclosure no longer adopt a page design method in a two-dimensional surface, but implement a page having a three-dimensional effect. In other words, an object displayed in a page is no longer displayed in a two-dimensional surface, but has a three-dimensional display effect. Apparently, if pages in a sales platform are designed in a three-dimensional manner, the pages can obtain a more fashionably impressive display effect, and allow users to obtain shopping experience more similar to shopping offline stores in reality. This therefore helps improving a conversion rate of pages.

Figure 1:
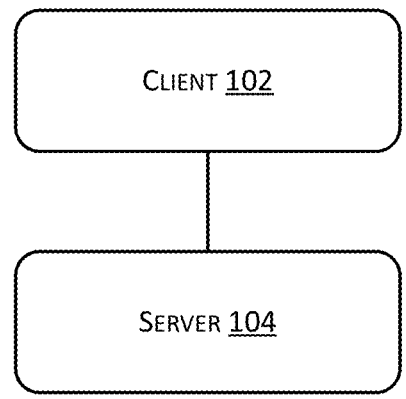
FIG. 1 shows a schematic diagram of a structure of a system in accordance with the embodiments of the present disclosure.

Prior to describing the details of the solutions, it should be noted first that the embodiments of the present disclosure can be divided into two parts—a client 102 and a server 104 as shown in FIG. 1, from the perspective of product architecture. The client may be an application client on a mobile terminal device, or a related component that is implemented in a page when the page is browsed using a browser. The server may be a server of a sales platform. The server is used for generating a page and providing related page data to the client after receiving an access request from the client. The client is used for displaying the page based on the page data provided by the server. In the embodiments of the present disclosure, the client may also perform operations such as controlling a specific display effect, etc., in a process of displaying a page. Implementations of the solutions are described in detail hereinafter.

First Embodiment

Figure 2:
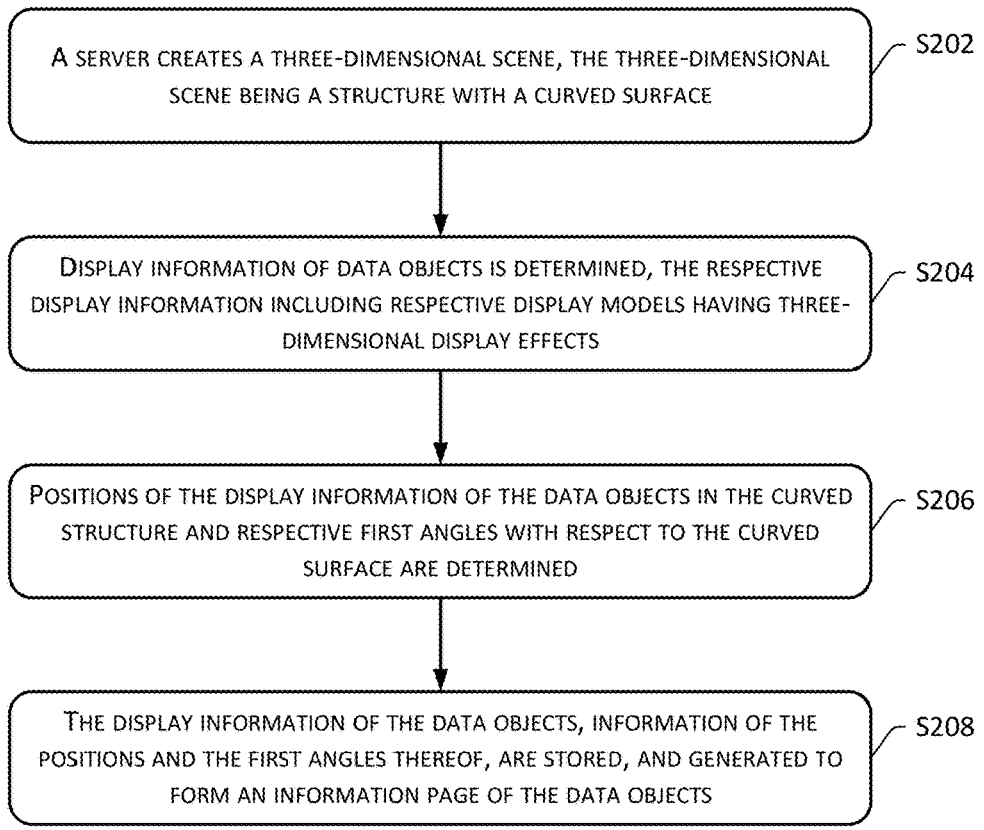
FIG. 2 shows a flowchart of a first method in accordance with the embodiments of the present disclosure.

In the first embodiment, a method 200 of generating an information page of a data object is provided first. Referring to FIG. 2, the method 200 may include the following operations.

At S202, a server creates a three-dimensional scene, the three-dimensional scene being a structure with a curved surface.

An information page of data objects can be a three-dimensional page implemented using a three-dimensional page technology. During implementation, a three-dimensional scene may be created first. A display model of data objects can then be placed in the three-dimensional scene. With respect to setting a three-dimensional scene, an example implementation may be a three-dimensional navigational scene, which is similar to many first-person games in that a first-person view is used to "stroll and play" in a scene. However, this type of approach faces challenges in aspects such as showing of information of data objects (which include a product object, a brand object, etc.) and system performance.

Accordingly, the present disclosure proposes a "curved surface" scene scheme that simplifies a scene and maintains a display model. For example, an implementation of a curved surface may include a curved surface of a ring shape that has a certain width. This type of ring-shaped curved surface is a scene scheme that is similar to a "barrel". A display model of a data object is placed on the "barrel". The width of a rotating surface (i.e., the width of the ring-shaped curved surface) can be the same as the width of a display range of a screen. In a process of movement of the three-dimensional scene, a curved structure of the ring shape is rotated about an axis of rotation thereof (an axial direction of the axis of rotation can generally be aligned in parallel with a placement of a terminal device when display, such that a user can trigger to roll the scene by means of sliding the screen up and down). At the same time, a curved surface that enters into a viewable region of the screen of the terminal device is a portion of the rotating surface in a direction of rotation. The user can trigger to roll the curved surface by means of sliding on the screen of the terminal device, to view information of data objects placed on other portions of the curved surface. This type of method can simplify the scene, and can prevent the system performance from suffering a severe influence. Apparently, in a real application, the above curved structure may also have other implementations. Examples may include a spherical surface, an arc-shaped curved surface, etc.

At S204, respective display information of data objects is determined, the respective display information including respective display models having three-dimensional display effects.

A data object may include a product object, a store object, or a brand object, etc. In implementations, since a three-dimensional scene is used, an associated data object may also possess corresponding display information. In implementations, the display information may include a display model having a three-dimensional effect, and is associated with the data object. For example, a three-dimensional stereoscopic display model may be formed based on a name, a logo (a graphic logo), a representative image of a certain brand, etc. In implementations, these types of display models can be distributed over the curved surface, and can be placed in an upright position with respect to the curved surface, having a defined angle with the curved surface. An example may be to have an angle of 90° from a tangential line of the curved surface, so that the curved surface in the entire scene is the "ground", with a visual effect of placing the display models on the "ground".

From the perspective of system performance, the performance is usually limited by the polygon count of a single display model (for a three-dimensional model, the more detailed the three-dimensional model is, the more apparent the effect is and the larger the displayed polygon count is) during an actual display process. When a test using a certain mobile terminal device is performed, it is noted that the frame rate has reduced to about 20 fps when the polygon count is about thirty thousand (with thirty display models). Apparently, the polygon count is not the only indicator that determines the performance, but can be used as a basis for selecting some solutions. In a real application, display models for at least sixty data objects are needed. Therefore, the polygon count that is involved is larger, and some issues may exist in the front-end performance.

Accordingly, when display models are designed, the embodiments of the present disclosure may also perform additional optimization. In implementations, a paper-style drawing board may be used to produce a display model having a three-dimensional display effect, i.e., an "advertising board" solution. The paper-style drawing board can be actually viewed as flattening a three-dimensional display model, with a final display model being "thin" as a paper. In this way, the polygon count of the display model can be reduced. Furthermore, this type of paper-style drawing board also possesses some three-dimensional feeling by itself. It is because a number of two-dimensional graphics can have a feeling of three-dimensional effect when a field of view is consistent with an angle designed by a designer due to a perspective effect. By using this type of paper-style drawing board to generate a display model, the display model is enabled to possess a three-dimensional effect, and the displayed polygon count that is needed is also reduced. As a result, the system performance is further improved. Moreover, since the "advertising board" is relatively common in real life, such as large shopping regions, busy streets, etc., the display model that is generated using the paper-style drawing board can also allow users to obtain experience that is more similar to offline "shopping around the streets".

In a real application, display models of which data objects are to be displayed in the three-dimensional scene may be determined by methods such as leasing. For example, if a display object in a page is related to recommended information such as a store of a merchant or a brand, a server of a transaction platform can send leasing invitations to a number of merchants. If a merchant has a corresponding need, the merchant can submit an application for participation. Correspondingly, the server of the transaction platform can generate a specific display model based on a name, a brand logo, a representative image, etc., of the merchant. The actual display model can be provided by the merchant. Alternatively, the server of the transaction platform can generate a specific display model based on information of the merchant. Apparently, after the display model is generated, the server of the transaction platform can also send the display model to the merchant for confirmation, and place the display model in the three-dimensional scene of the page upon confirmation of the merchant. Furthermore, in a real application, production of display models can also be completed by a third party that has a stronger design capability. In other words, the server of the transaction platform can provide information of a related merchant to a third-party design company, and the third-party design company designs a paper-style display model. The server of the transaction platform can similarly send the display model that is designed and completed by the third-party design company to the corresponding merchant for confirmation, for example.

In the embodiments of the present disclosure, it is noted that a number of data objects that are displayed in a same page may be limited. For example, about sixty data objects may be set up. Apparently, in a real application, information of more or fewer data objects can be displayed according to an actual need. Furthermore, when determining how many data objects are to be displayed, an area of the three-dimensional scene that is created may also be taken into consideration. It is because the area thereof is fixed after the three-dimensional scene is created. In this case, if an excessive number of display models of data objects are displayed in the scene, a degree of differentiation of information is reduced due to overcrowded display models.

At S206, positions of the respective display information of the data objects in the curved structure and respective first angles with respect to the curved surface are determined.

After display models related to the data objects that are to be displayed in the three-dimensional scene are determined, the display models can be placed on a curved surface corresponding to the three-dimensional scene. In implementations, a map editor can be provided. The editor can be used for editing a position and an angle, etc., of placing a display model on the curved surface. The angle may refer to an angle formed between a front face of the display model and a tangent plane of the curved surface at the corresponding position. By default, this angle may generally be about 90°. In other words, when a line of view of a user is parallel to a tangent plane of a curved surface at a certain position, a front face of a display model that is displayed at that position can just face directly toward the line of view of the user. As such, information displayed by the display model can obtain the best angle of exposure.

At S208, the display information of the data objects, information of the positions and the first angles thereof, are stored, and generated to form an information page of the data objects.

In response to receiving a request for displaying the information page of the data objects, the display information of the data objects is displayed in the three-dimensional scene according to the information of the positions and the first angles.

After the information of the positions and the first angles of the display information of the data objects in the three-dimensional scene is determined, these pieces of information can be stored. When a page is displayed, the display information of the data objects can be placed at the corresponding positions in the three-dimensional scene for presentation based on these pieces of information. In implementations, since the curved surface of the three-dimensional scene can be a structure having a rotating surface, the display information of the data objects can be placed on an outer surface of the rotating surface, or may additionally or alternatively be placed on an inner surface, for example. An actual implementation can be determined according to an actual need or requirement. For example, when the curved structure is a ring-shaped rotating surface having a defined width, an example page display effect can be like the one shown in FIG. 3.

Using the above method, a most basis three-dimensional page can be implemented. However, in order to obtain a balance among a display effect, a page performance and an efficiency of development in a real display process, the embodiments of the present disclosure can perform optimization for aspects such as a configuration of a scene, a display method of a display object, etc., in a three-dimensional page.

In implementations, the embodiments of the present disclosure can first perform optimization for the display effect. In other words, in the embodiments of the present disclosure, since display models of data objects are displayed on a curved surface, how to ensure showing the maximum amount of information while ensuring a three-dimensional display effect at the same time is a problem that needs to be elaborated in the embodiments of the present disclosure.

In implementations, under same technical conditions, an amount of information shown in a scene of a two-dimensional flat surface is maximized, as compared to a three-dimensional scene. It is because the flat surface is guaranteed to be 100% facing toward a user. However, it will be a problem that needs serious consideration if a three-dimensional display effect and an enough degree of information exposure are needed to be ensured at the same time. In the embodiments of the present disclosure, under the circumstances that a rotating surface structure having a ring-shaped rotating surface with a preset width, a circumference of rotation of the rotating surface structure with a barrel-like structure can be adjusted to cause the circumference of rotation to be a multiple of an arc length of a portion of curved surface that is displayed in each screen of a terminal device. As such, a curved surface that enters into a viewable region of the screen of the terminal device possesses a three-dimensional effect, and the number of data objects shown in each screen satisfies a preset condition.

Figure 4:
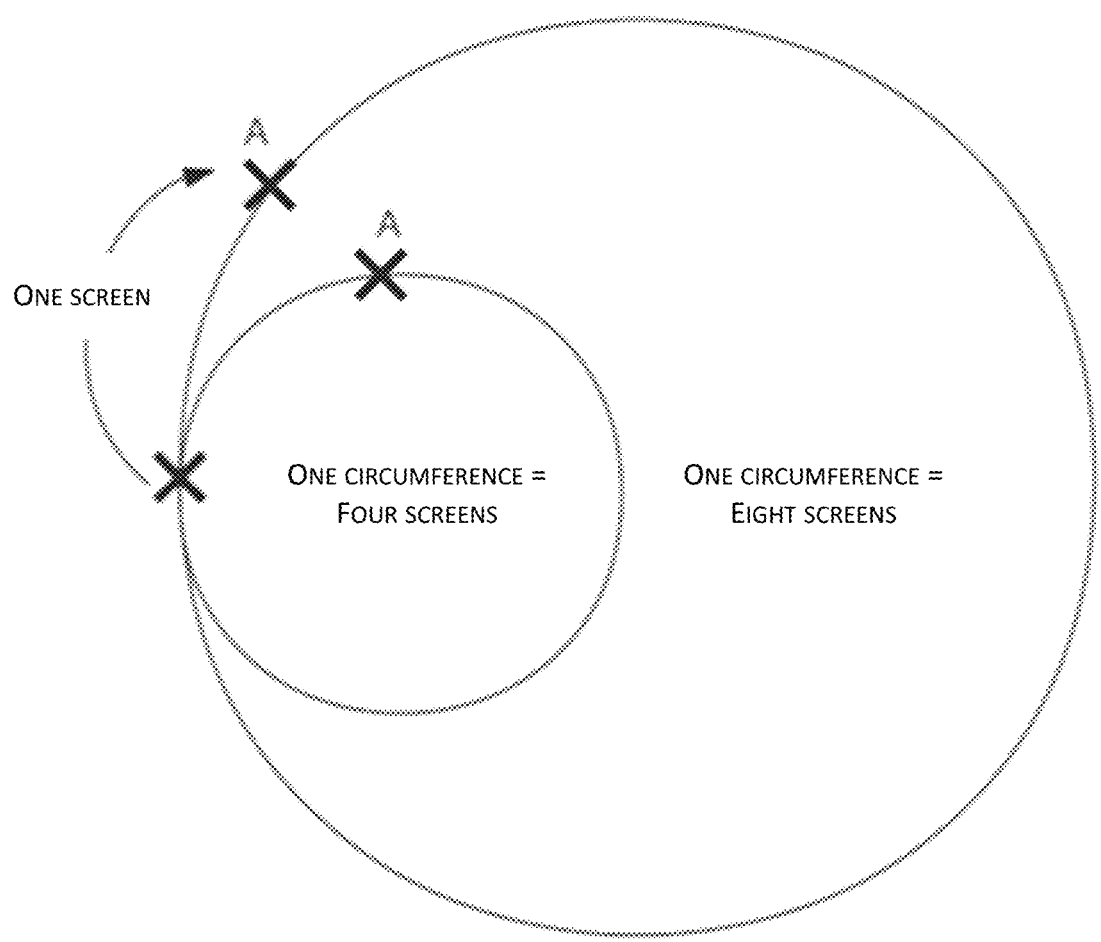
FIG. 4 shows a schematic diagram of a circumference of a rotation in accordance with the embodiments of the present disclosure.

In the embodiments of the present disclosure, a precondition may include displaying a portion of a rotating surface structure in a single screen (a single screen is a full screen of a terminal device such as a mobile phone). In theory, "a portion" herein may be an arbitrary value. However, how large a proportion is in order to ensure a three-dimensional display effect and also to ensure an enough degree of exposure of information needs to be adjusted correspondingly. In implementations, a number of different solutions can be compared first in order to search for the best "proportion". For example, two types of solutions—"1 circumference=8 screens (M solution)" and "1 circumference=4 screens (N solution)" are compared. As shown in FIG. 4, if a cross-section of a ring-shaped rotating surface structure is extracted, a spherical structure is obtained, with a point A being an indicator showing an end of one screen. As can be seen from the comparison, the M solution can ensure the exposure of information as much as possible, because an entire arc surface thereof is more like to be a flat surface as compared to the N solution. However, a three-dimensional feeling of the M solution is relatively poor because an arc length is not enough and lacks variations in distance. According to the rule of "small when near and large when afar" in the three-dimensional world, the point A demonstrates a more realistic three-dimensional feeling under the "1 circumference=4 screens" strategy. Furthermore, one screen corresponding to an angle of 90° is guaranteed, with 90°-110° as a relatively reasonable angle of capture of a three-dimensional image capturing device. Moreover, 90° may also ensure different types of display models such as buildings on the ground, decorations, etc., to face directly toward a user. Furthermore, if a solution of "1 circumference<4 screens" is used, the exposure of information of a scene becomes less, though the three-dimensional feeling is relatively similar to that of "1 circumference=4 screens".

As a summary of the above analysis, the embodiments of the present disclosure can adopt the "1 circumference=4 screens" solution. In this way, a three-dimensional display effect and an enough degree of exposure of information can be ensured at the same time.

Figure 5:
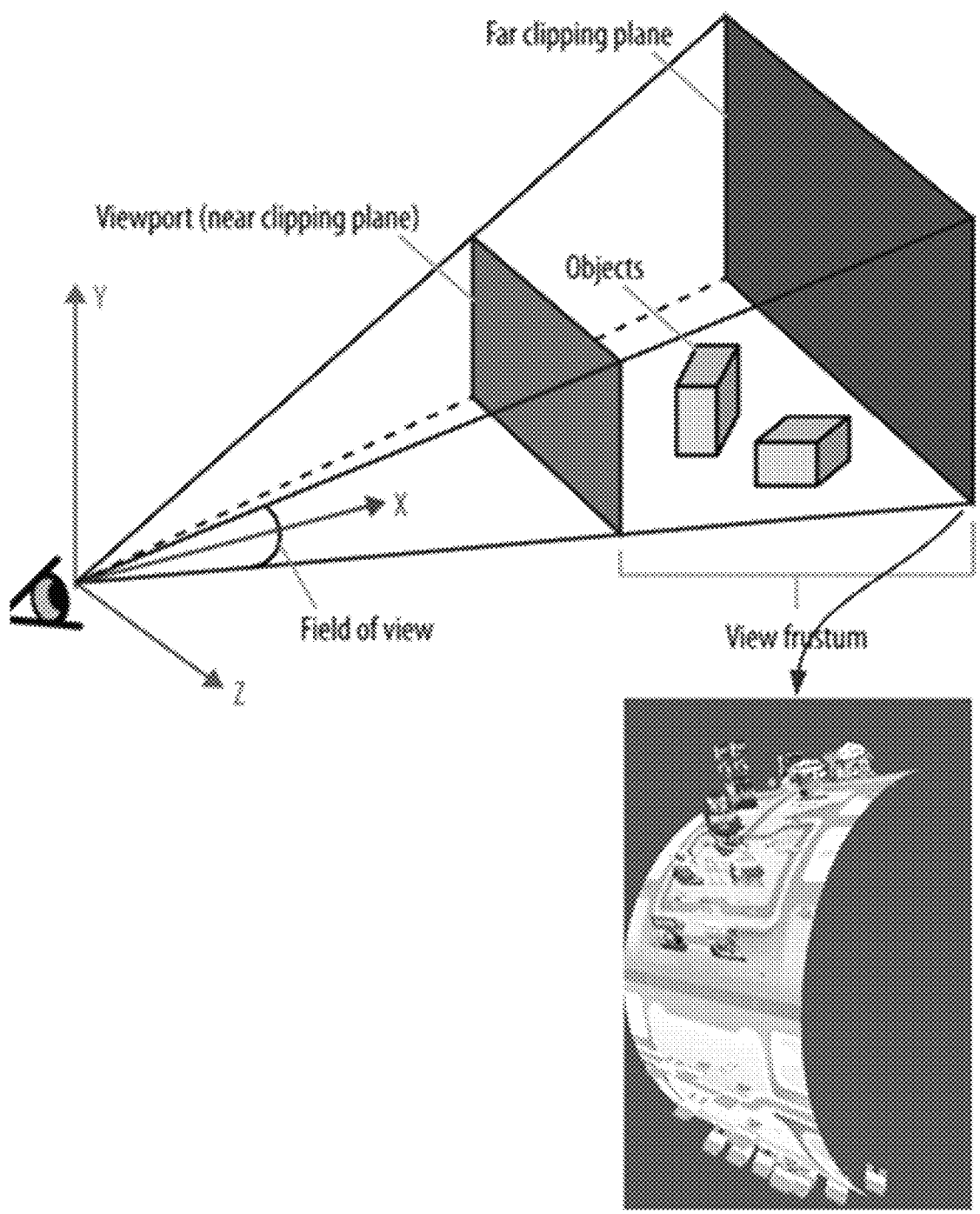
FIG. 5 shows a schematic diagram of an object of an image capturing device in accordance with the embodiments of the present disclosure.

From the technical point of view, a camera object can also be created when creating a three-dimensional scene. In general, the camera object may technically be called as a frustum of observation or a view frustum. As shown in FIG. 5, parameters thereof may include at least:

field of view, a visual angle, which indicates an angle of a visual field of the frustum, with degrees as units, measured from y-axis;

viewpoint (near clipping plane), a near end of a distance between two clipping planes along a direction of z-axis, which is used for indicating a distance from an observer to the nearest clipping plane of the frustum; and viewpoint (far clipping plane), a far end of a distance between two clipping planes along the direction of z-axis, which is used for indicating a distance from the observer to the farthest clipping plane of the frustum.

By suitably configuring the parameters of the camera object, display models in the three-dimensional scene can show three-dimensional display effects. In the embodiments of the present disclosure, an implementation of a three-dimensional scene may be like the one shown in the bottom part of FIG. 4, which apparently only shows a portion of a barrel structure. A viewable region of the camera object is usually the same as a three-dimensional scene region in a page observed by a human. Therefore, a direction of observation of the camera object can represent a direction of observation of a user to a certain extent.

When adjusting the circumference of rotation, the circumference of rotation may be adjusted to be an integral multiple of times (e.g., four times) of an arc length of a portion of a curved surface that is displayed by each screen of a terminal device. In other words, when a three-dimensional scene is created, a circumference of rotation thereof may be made to satisfy a condition of "1 circumference=4 screens". After the circumference of rotation is determined, a portion that enters into a viewable region can be determined to correspond to what fraction of the circumference. A length of the circumference of rotation can be obtained by calculation, and is not described in detail herein.

Furthermore, in the embodiments of the present disclosure, other than adjusting the length of the circumference of rotation, parameters of a position and/or angle of the camera object can also be adjusted, to cause the width of the rotating surface to fill up the screen of the terminal device, and to reserve a blank region above the three-dimensional scene in advance. This is because blank spaces appear at the left and right hands of the screen if the width of the rotating surface does not fill up the screen, possibly affecting the entire display effect. If the width of the rotating surface exceeds the width of the screen, a user needs to slide the page to the left or to the right in order to view the entire information along the direction of the width of the rotating surface, resulting in inconvenient and unreasonable operations. Therefore, in implementations, a solution in which the width of the rotating surface substantially or exactly fills up the screen in the direction of the width can be adopted. Furthermore, a blank region above the three-dimensional scene may be reserved in advance. This is because placements are generally made in an "upright" manner when display models are placed in the three-dimensional scene. In other words, the display models are looked like to stand on the curved surface. Therefore, a defined blank space above the three-dimensional scene may be reserved for presenting these display models.

In implementations, the above goals can be achieved by adjusting the position and the angle of the camera object. With respect to an angular parameter, for example, an angular parameter of the camera object, i.e., a size of a field of view, can be treated as an angle of an opened eye of a human. If the angular parameter is set as 0°, this is equivalent to a closed eye and nothing can be seen. If the angular parameter is set as 180°, the field of view can be considered to be very broad. However, objects usually appear to be small when the angle parameter is 180°, because the proportions of the entire viewable region that the objects occupy become smaller. In other words, the larger the field of view is, the smaller the object therein is. This is because a larger field of view leads to a larger scene that can be seen, and objects therein become smaller as compared to the entire scene. Therefore, in implementations, the angular parameter of the camera object is set to be a suitable value, for example, can be set to be within a range of 40°-45° in the embodiments of the present disclosure.

The position of the camera can be configured through a preset function, for example, camera.position.set (0,1,1). A direction of observation can be pointing in an opposite direction of a z-axis. If the position of the camera is (0,1,1), the direction of observation lookAt is (0,1,0).

It should be noted that a number of different ways of generating the above page exist technically. For example, CSS3 (cascading stylw sheet 3, an upgrade version of cascading style sheet technology) can be used to simulate and implement the above effects. However, some unavoidable issues exist when CSS3 is used for processing this type of scene. For example, when a ring-shaped curved surface of a three-dimensional scene having a certain width is created, the ring-shaped scene needs to be cut into a number of facets first if CSS3 technology is used. The mapping workload is huge, and the effect is not good. Furthermore, after the cut shapes are assembled to form a large shape, a "black edge" problem exists in the border. Moreover, during an interaction stage, problems such as black screen, white screen and blinking may be happened in a process of interpreting the rotation of the curved surface.

In short, CSS3 is actually more suitable for some small scenes. Moreover, the shape and the texture of an object are the most intuitive features in a three-dimensional representation. The shape is an appearance that is finally shown, and the texture attached to the surface. Other than these features, illumination, environment (fog, rain), reflection, materials can be obtained by performing calculations on the color of the surface of the materials, a RGBA that is finally obtained can be used to make the object to present a rich appearance. However, CSS3 would run short of ways in creating the shape of a three-dimensional object. Accordingly, in an example implementation, WebGL technology may be selected to implement the design of the above three-dimensional page.

In order to communicate with a production department of display models in a better manner, an editor specific to three-dimensional pages may also be provided. Compiling of the editor can follow an idea of modularization, and insertion and extraction can be performed dynamically, to reduce the degree of coupling with the rendering of a main scene. An ultimate goal of the editor is to produce scene data that fulfills graphical expectations. Furthermore, a mapping can be established between business data and scene data, to facilitate searches. For example, a brand name of a scene may be named with an ID of a store, to help performing an association between these two types of data.

In short, in the embodiments of the present disclosure, when a page of data objects is generated, a three-dimensional scene can be created, and respective display information of the data objects is determined. The respective display information includes respective display models having three-dimensional display effects. Positions of the respective display information of the data objects on a structure with a curved surface, and angles formed with the curved surface can then be determined. As such, the respective display models of the data objects can be displayed through the three-dimensional scene. This can therefore obtain a more impressive page display effect, and is more like experience about shopping in offline real stores, thus helping to improve a conversion rate of the page.

Under the circumstance that the curved surface is a rotating surface, a circumference of rotation can be adjusted to cause the circumference of rotation can be made to be an integral multiple of times of an arc length of a portion of a curved surface displayed by each screen of a terminal device, e.g., may be four times. The preconfigured display models of the data objects are placed in the three-dimensional scene to generate the information page of the data objects. According to a rule of "small when near, large when afar" in the three-dimensional world, a strategy of "one circumference=four screens" can therefore manifest a more realistic three-dimensional feeling, and ensure a single screen to display an angle of 90° at the same time. Since 90°-110° are relatively reasonable angles of capture for a three-dimensional camera, this approach can also ensure the display models in the three-dimensional scene to face towards a user. In short, a three-dimensional display effect can be ensured, while a sufficient degree of exposure of information is also guaranteed.

Second Embodiment

Figure 6:
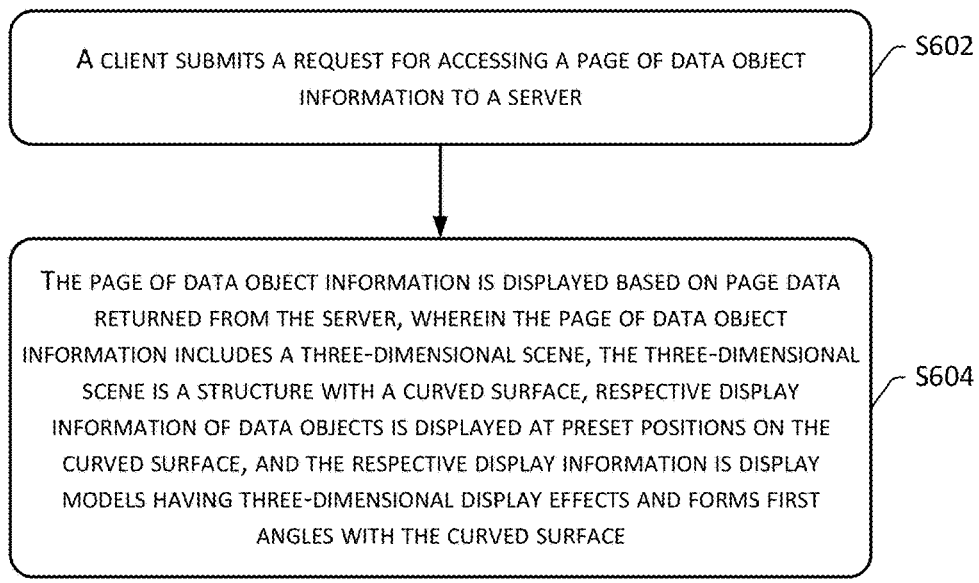
FIG. 6 shows a flowchart of a second method in accordance with the embodiments of the present disclosure.

In the first embodiment, a page generation method is provided. In this second embodiment, a method 600 for providing an information page of data objects is provided from the perspective of a client. Referring to FIG. 6, the method 600 may include the following operations.

At S602, a client submits a request for accessing a page of data object information to a server.

At S604, the page of data object information is displayed based on page data returned from the server, wherein the page of data object information includes a three-dimensional scene, the three-dimensional scene is a structure with a curved surface, respective display information of data objects is displayed at preset positions on the curved surface, and the respective display information is display models having three-dimensional display effects and forms first angles with the curved surface.

As shown in the first embodiment, in implementations, the structure with the curved surface can be a structure with a rotating surface. The display information of the data objects is distributed over an outer surface of the rotating surface. The structure with the rotating surface includes a ring-shaped rotating surface having a preset width. In order to ensure an enough degree of exposure of information while ensuring a three-dimensional display effect at the same time, a circumference of rotation can be adjusted to be an integral multiple of times (e.g., four times) of an arc length of a portion of a curved surface that is displayed by each screen of a terminal device.

Figure 7:
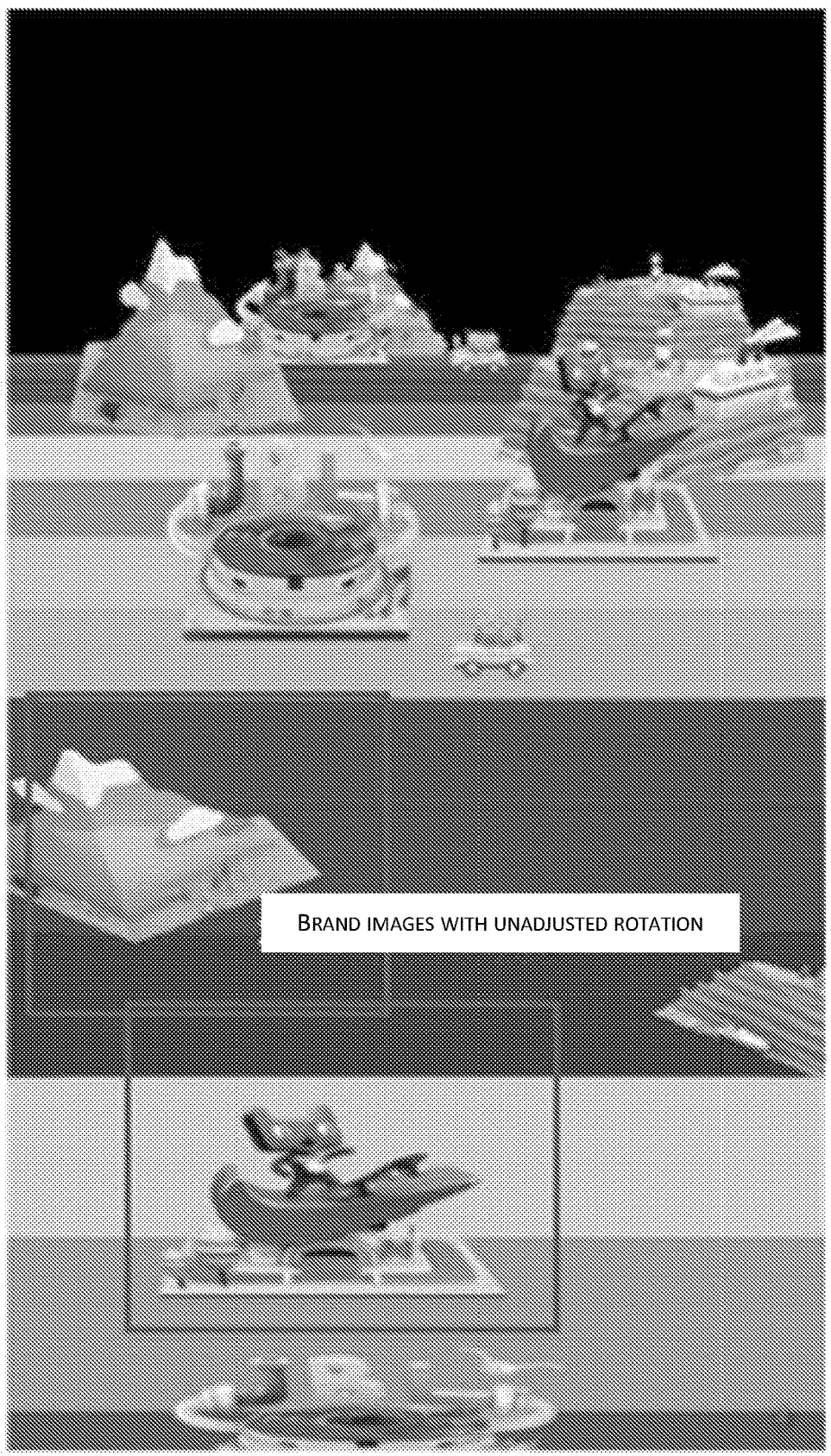
FIG. 7 shows a schematic diagram of a second interface in accordance with the embodiments of the present disclosure.

In an actual process of displaying a page, a plurality of display models generally enter into a viewable region of a camera object regarding of any state. This would lead to an occurrence of the following situation: only one or a few display models approximately facing toward a line of view of a user in a three-dimensional scene, and other display models failing to face directly toward the line of view of the user due to angles between the display models and a direction of observation of the user being either too large or too small. As a result, a degree of exposure of information is not enough, and a display effect becomes poor, even resulting in situations such as an incomplete display of information or a mutual occlusion between nearby display models. For example, when the movement of the curved surface comes to a certain state, a situation as shown in FIG. 7 may happen for display models that are presented. In other words, display models may appear to be visually laid flat on the curved surface, rather than having an "upright" three-dimensional display effect. Some information such as texts or images may even fail to be displayed clearly, for example. In the process of displaying the page, if a same screen displays display models of multiple data objects and differences exists between different display models with respect to degrees of exposure of information that affect display effects, the efficiency of displaying information will apparently be affected. Furthermore, corresponding merchants generally cannot accept an occurrence of this type of situation.

Accordingly, in the embodiments of the present disclosure, target display models that enter into the viewable region of the screen of the terminal device may also be determined in the process of displaying the page of the data object information. Moreover, respective first angles between the target display models and the curved surface may be adjusted based on second angles formed between the target display models and a direction of observation of the user (for example, the direction of observation of the user may be represented by a direction of observation of the camera object created in the three-dimensional scene). In implementations, when a second angle exceeds a preset data value range, a corresponding first angle can be adjusted, to cause the second angle (i.e., the included angle) to be adjusted to a value within the preset data value range. In other words, if the preset data value range is [80°, 100°], a display model can be rotated to cause an included angle between a front face thereof and the direction of observation of the camera object to get into the range of [80°, 100°] (the best to be 90°), if a second angle between the display model and the direction of observation of the user is less than 80° or greater than 100°. In implementations, when the first angle is adjusted, the display model can be rotated according to a preset axis of rotation. In implementations, the bottom part of the front face of the display model can be used as the axis for performing the rotation. For example, when the display model is a paper-style drawing board, a portion of the drawing board that is in contact with the curved surface is the bottom part of the drawing board. When a rotational operation is performed for the drawing board, the bottom part of the drawing board can act as an axis for rotation, to allow a change in an angle between a front face of the drawing board and the curved surface. Thus, an angle between the front face of the drawing board and the direction of observation of the camera object is changed.

It should be noted that display models in a three-dimensional scene can include two types. A first type of display model is a display model that needs to be displayed in each frame, i.e., stays in the viewable region of the camera object. Examples include a "character image", a "fountain", etc., that are virtualized in the scene. These displayed objects may generally appear in each displayed frame. Furthermore, even if a page is in a static state, this first type of display object may continuously move according to a predefined program. For example, a "character image" may continuously move to the left and right, back and forth, etc., to simulate a scene in which people are walking, or a "fountain" may continuously "spring out water". Therefore, when an included angle between a front face of a target display model and a direction of observation of the camera object is determined in this operation, the method 600 may include determining an included angle that is formed between a front fact of the first type of display model and the direction of observation of the user.

Alternatively, the three-dimensional scene may mostly include a second type of display model. This type of display model is a display model corresponding to a data object, and is used for providing display information of a store, a brand, for example. A characteristic thereof is to enter into the viewable region of the screen of the terminal device as the three-dimensional scene is moved. Furthermore, this second type of display model moves as the three-dimensional scene moves, and a position relative to the three-dimensional scene remains unchanged. For this second type of display model, a second angle formed between a front end of the second type of display model and the direction of observation of the user can be determined in the process of moving the three-dimensional scene. In other words, when entering into the viewable region of the screen of the terminal device, the second type of display model possesses a default display state, which includes a position on the curved surface, a first angle formed with the curved surface, etc. Based on these default values and the current direction of observation of the user, a second angle between the front face of the display model and the direction of observation of the user can be calculated. Furthermore, a second angle between a front face of a same display model and a direction of observation of a user may also change along with the movement of a three-dimensional scene. The embodiments of the present disclosure can track these changes, and adjust a first angle between the display model and the three-dimensional scene, to maintain the display model to face toward the direction of observation of the user directly.

Figure 3:
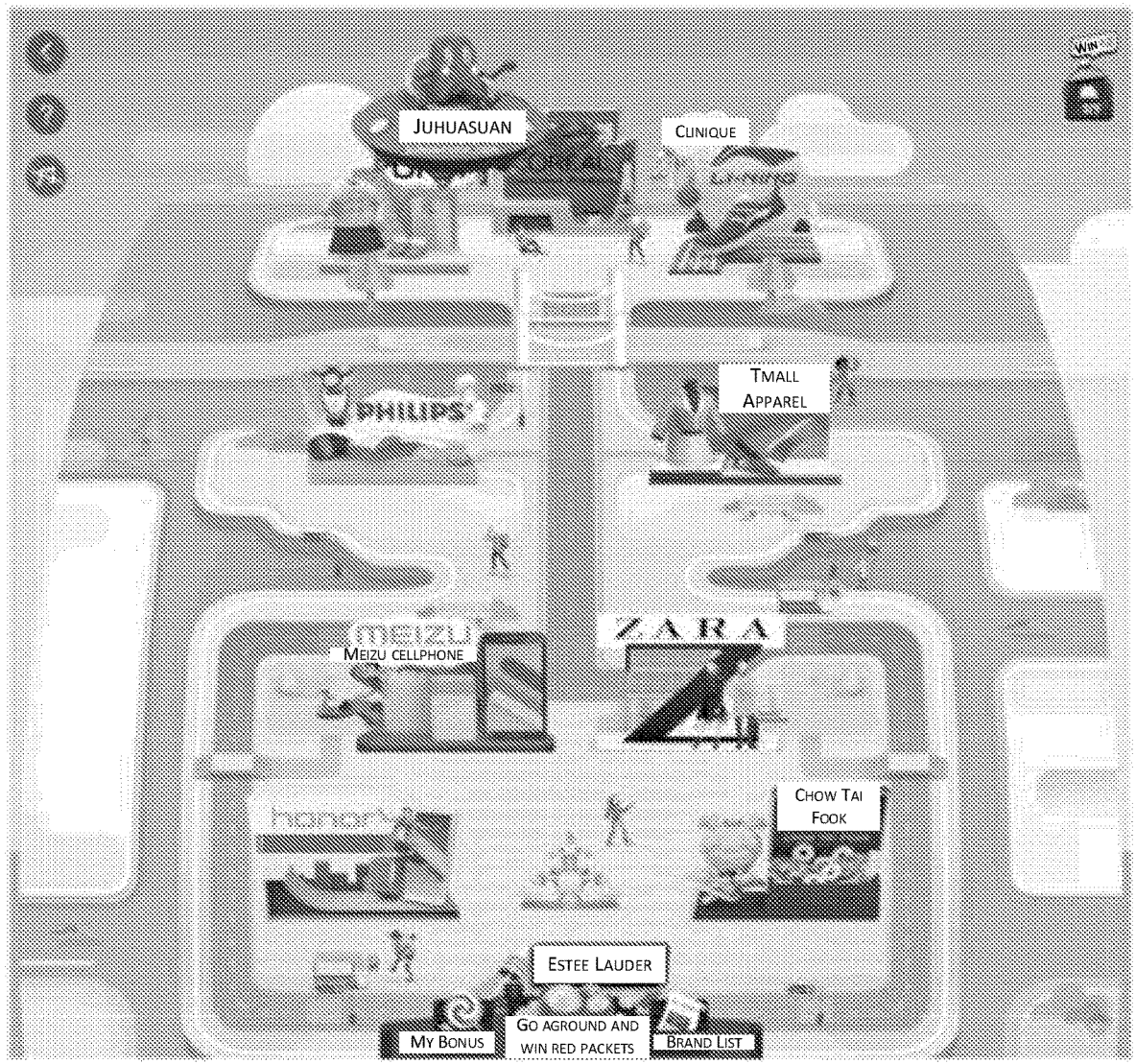
FIG. 3 shows a schematic diagram of a first interface in accordance with the embodiments of the present disclosure.
Figures 1, 8:
Figures 2, 8:
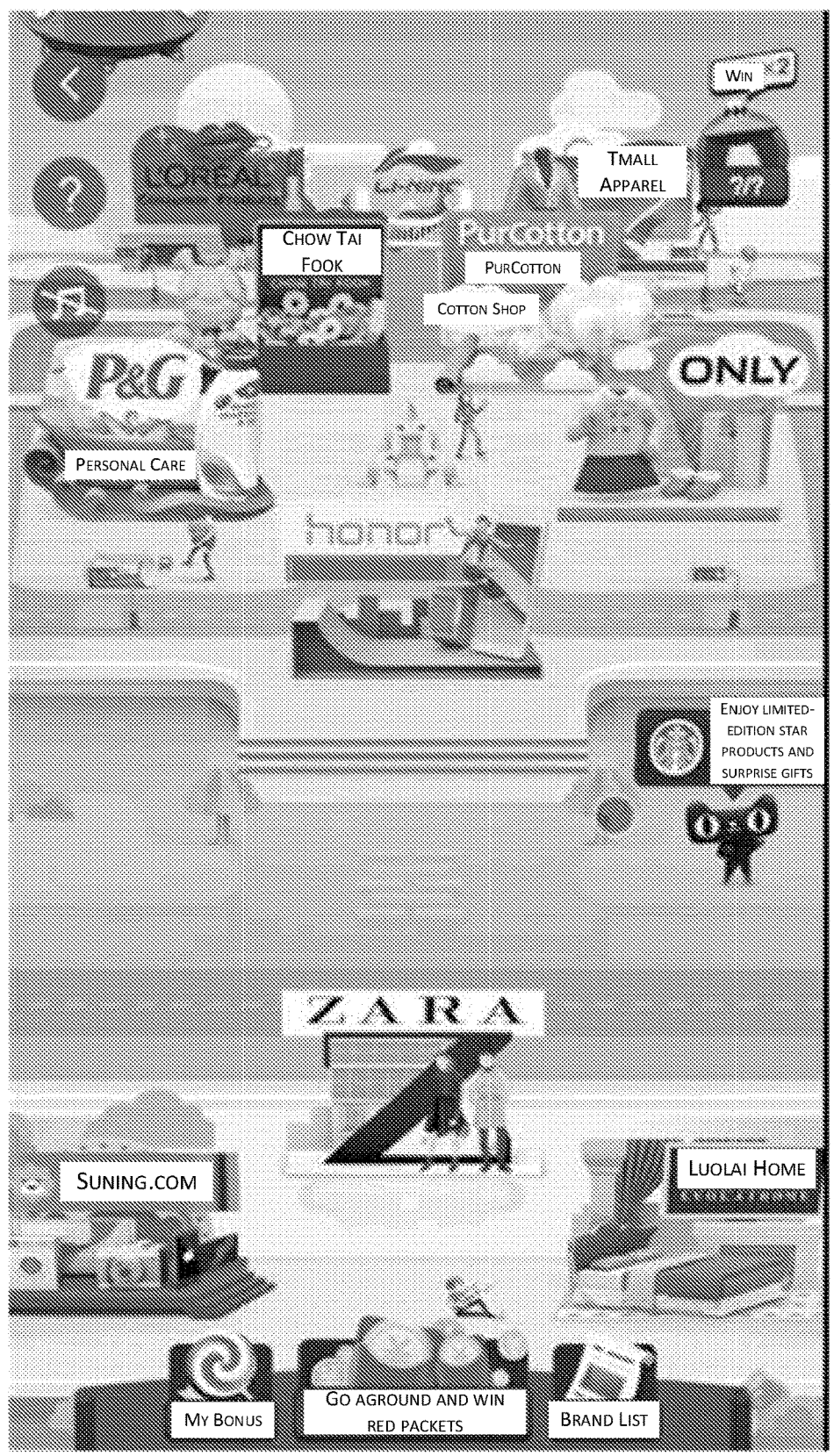
Figures 3, 8:
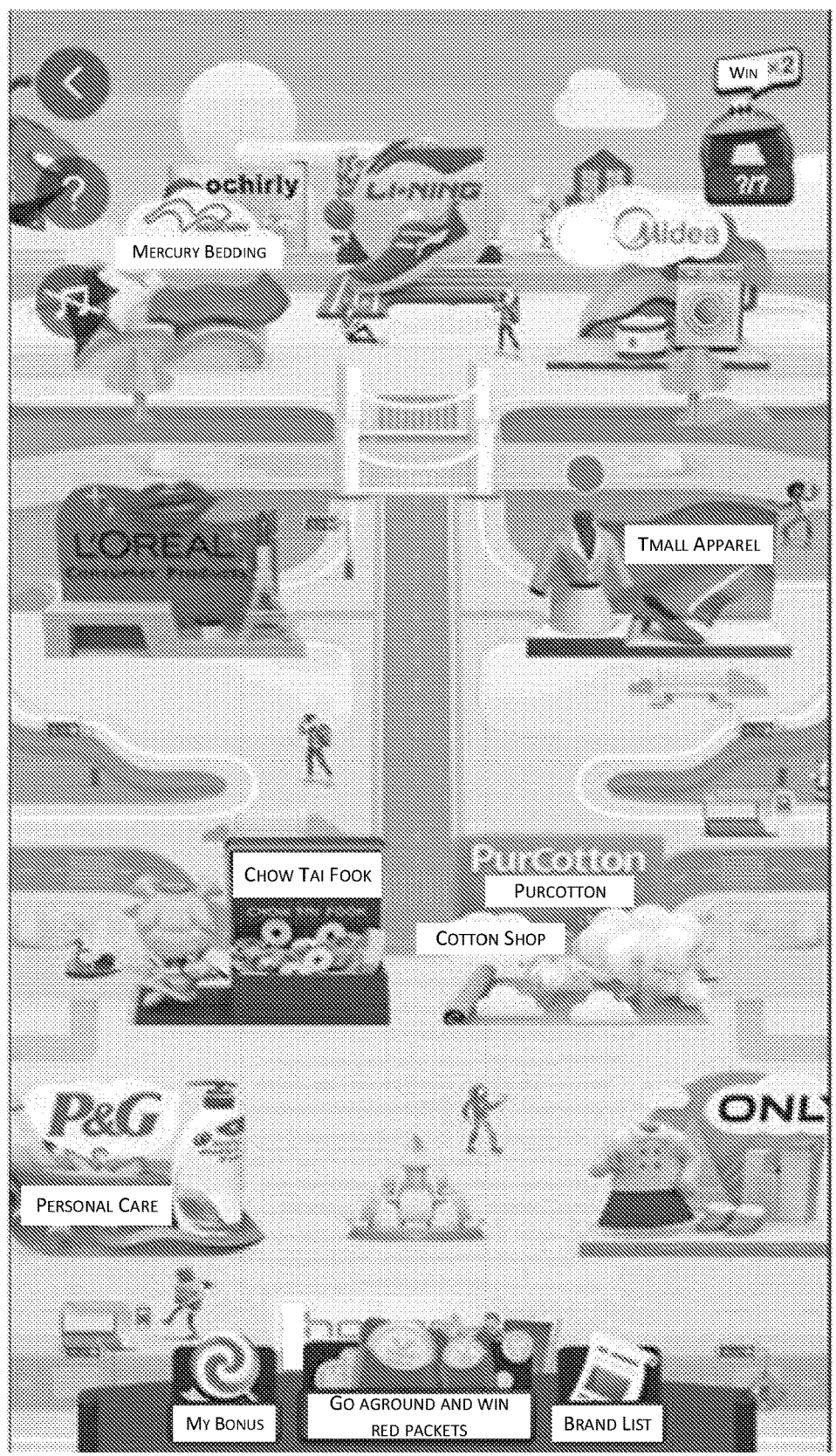

The movement of the three-dimensional scene may be executed in response to a trigger from the user. For example, the user performs an operation of sliding up or down on the screen of the terminal device. Correspondingly, the three-dimensional scene may roll up or down accordingly. In other words, the three-dimensional scene moves along with the sliding operation of the user on the screen. For example, FIG. 8-1 shows a display state of a three-dimensional scene in a page at a certain time $t_1$. When a user performs a sliding operation downwards on a screen, a curved surface rolls in a clockwise direction. At a certain time $t_2$, the display state of the three-dimensional scene in the page is shown in FIG. 8-2. As can be seen, related display models such as "ZARA' have moved to the lower part of the screen along with the movement of the curved surface, and display models such as "Purcotton" and "Chow Tai Fook" have gradually entered into a viewable region. When the user continues to slide on the screen, the display state of the three-dimensional scene in the page at the time $t_3$ is shown in FIG. 8-3. Display models such as "ZARA" have moved out of the viewable region, and correspondingly display models such as Purcotton" and "Chow Tai Fook" have entered into the center position of the viewable region, for example.

Figures 1, 9:
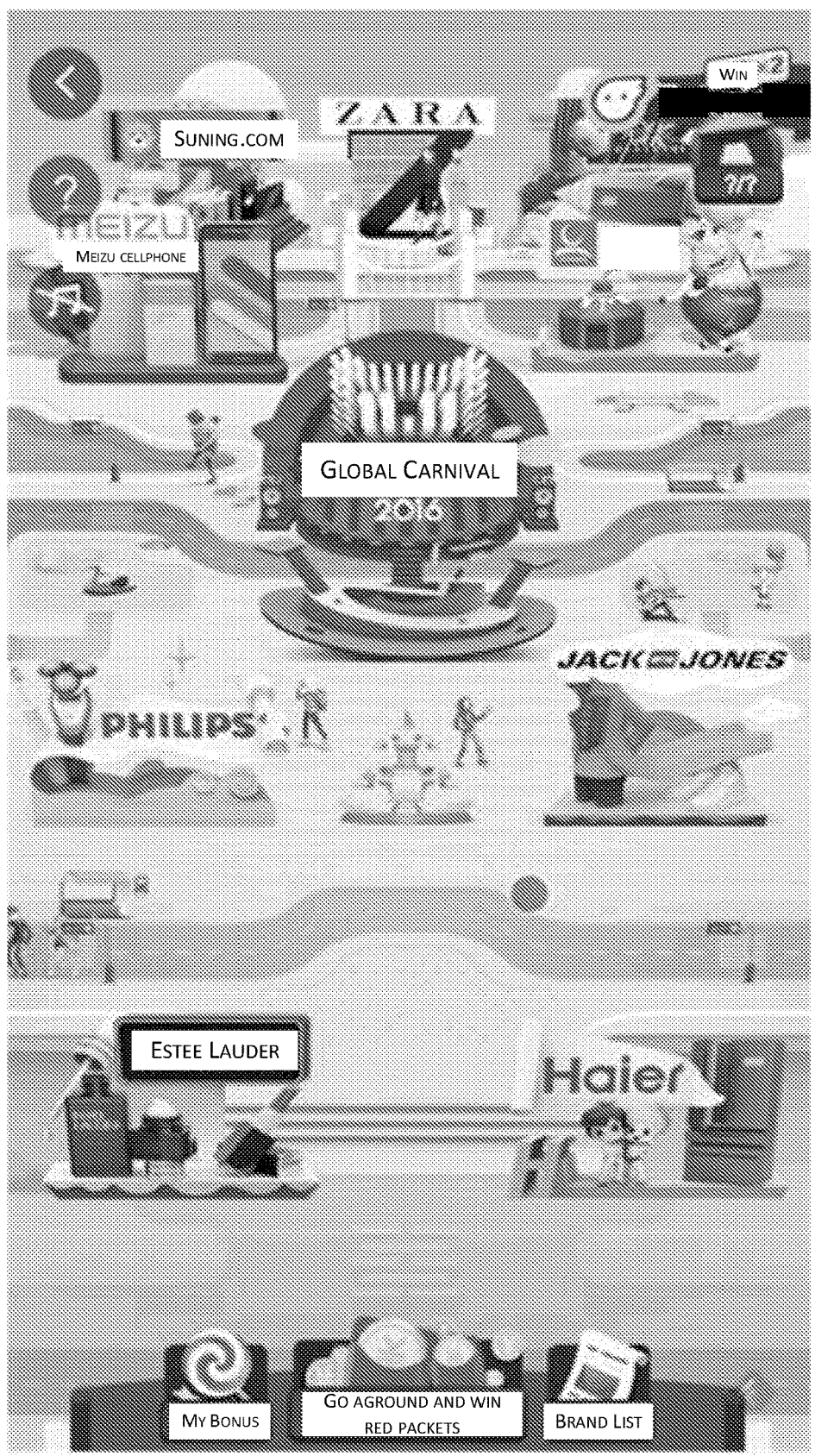
Figures 2, 9:

Alternatively, in another situation, an option of operation of "random walk" may also be provided to the user. The three-dimensional scene may first automatically roll in a certain direction, and stop at a place where a certain target display model is located. In other words, information related to that target display model is recommended to the current user. In implementations, after stopping at the place where the target display model is located, the three-dimensional scene may also be enlarged, and the viewable region of the camera object provides and displays an enlarged view of the target display model. For example, as shown in FIG. 5-3, an option of operation of "random walk" is displayed at the bottom-middle part of an interface. The user can trigger a random rolling of the curved surface through this option of operation. The curved surface may then roll in a relatively fast speed until arriving at a random position, and stop there. For example, FIG. 9-1 shows a stopping position. At this time, the target display model needs to be recommended to the current user is a display model related to "Meizu mobile phone". The three-dimensional scene can thus be partially enlarged, i.e., the target display model is zoomed in and displayed at the center position of the screen. For example, a state as shown in FIG. 9-2 may be displayed. In this case, the viewable region may primarily display information of the target display model, thus promoting this display model to the attention of the user.

A variety of different methods may exist for determining a target display model in the above function of "random walk". For example, a method using complete randomness may be adopted, or may also be combined with personalized preference information of related users to make a determination. For example, if a certain user is found to be relatively interested in electronic and digital products based on historical activity records of the user, information of this type can be preferably provided to the user, thus achieving a better guidance.

Furthermore, it should be noted that a user may also perform operations on display models in a three-dimensional page as described above when browsing the page. For example, if display models are related to certain brands or store objects, a store page of a target store may be jumped into and displayed when an operation is performed on a display model corresponding to the target store, thereby implementing guidance toward the store page.

Details of a method of generating a page in the second embodiment can be referenced to the description in the first embodiment, and are not repeatedly described herein.

Third Embodiment

Figure 10:
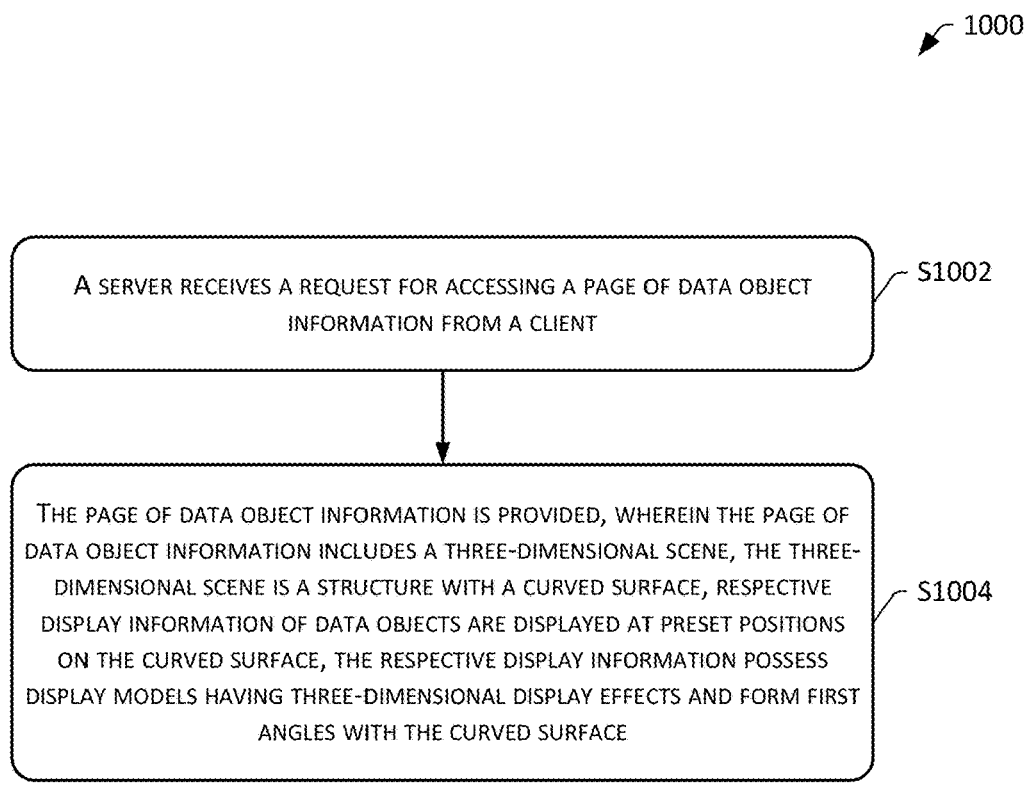
FIG. 10 shows a flowchart of a third method in accordance with the embodiments of the present disclosure.

The third embodiment is in correspondence with the second embodiment, and is described from the perspective of a server. Referring to FIG. 10, a method 1000 may include the following operations.

At S1002, a server receives a request for accessing a page of data object information from a client.

At S1004, the page of data object information is provided, wherein the page of data object information includes a three-dimensional scene, the three-dimensional scene is a structure with a curved surface, respective display information of data objects are displayed at preset positions on the curved surface, the respective display information possess display models having three-dimensional display effects and form first angles with the curved surface.

Details of implementations of the third embodiment can be referenced to the description of the first embodiment and the second embodiment, and are not repeatedly described herein.

Fourth Embodiment

In the fourth embodiment, a page of data object information is further provided. In implementations, the page of data object information includes a three-dimensional scene, the three-dimensional scene is a structure with a curved surface, display information of data objects is displayed at preset positions on the curved surface, the display information possesses display models having three-dimensional display effects and forms first angles with the curved surface.

In implementations, the structure with the curved surface may be a structure with a rotating surface. The respective display information of the data objects may be distributed over an outer surface of the structure with the rotating surface. In implementations, the structure with the rotating surface may be a ring-shaped rotating surface having a preset width. A circumference of rotation thereof may be an integral multiple of times (e.g., four times) of an arc length of a portion of a curved surface that is displayed by each screen in a terminal device.

Other features of this page can be referenced to the description of the foregoing embodiments, and are not repeatedly described herein.

Figure 11:
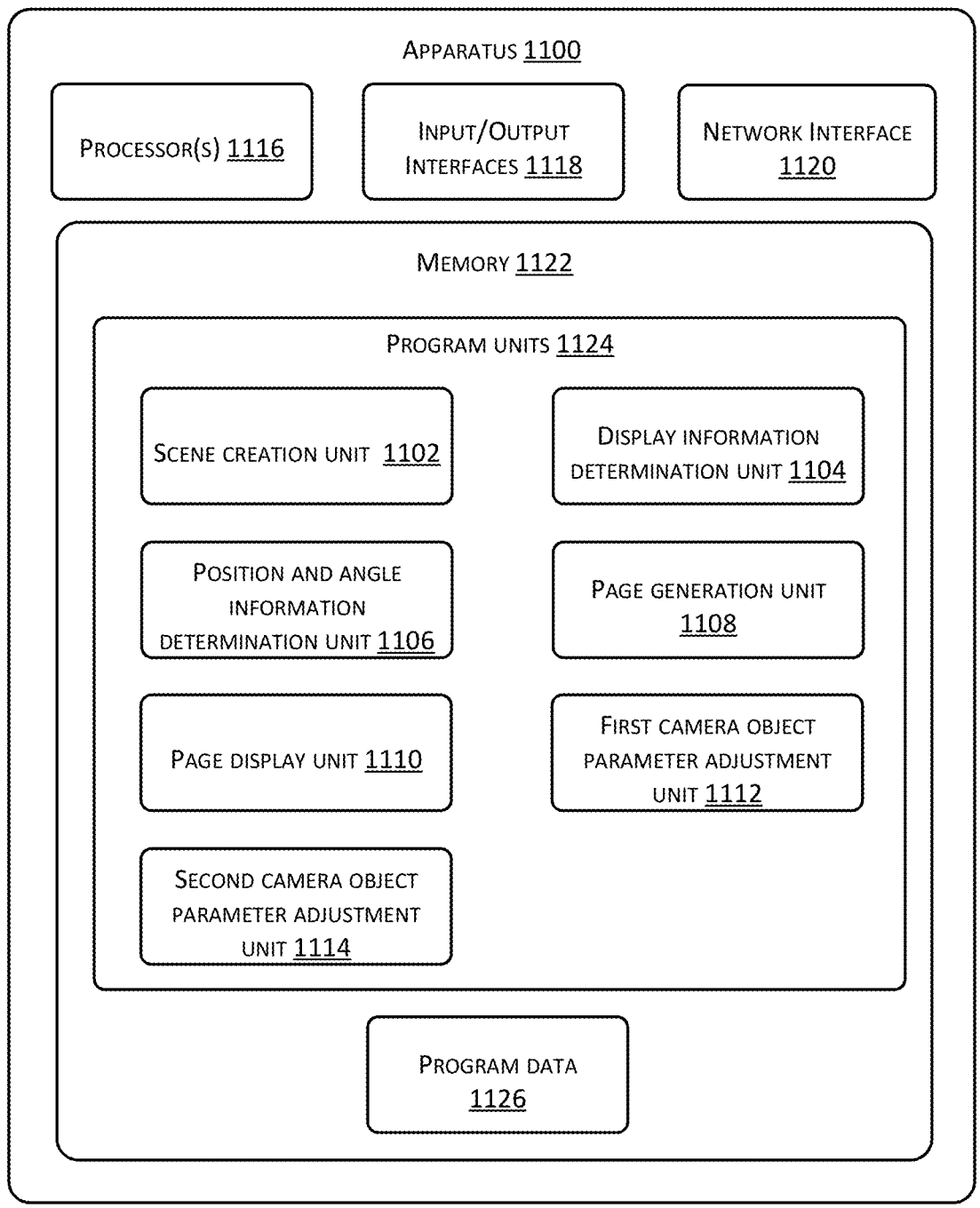
FIG. 11 shows a schematic diagram of a first apparatus in accordance with the embodiments of the present disclosure.

Corresponding to the first embodiment, the embodiments of the present disclosure further provide an apparatus for generating a page of data object information. Referring to FIG. 11, the apparatus 1100 is applied in a server, and may include a scene creation unit 1102 used for creating a three-dimensional scene, the three-dimensional scene being a structure with a curved surface; a display information determination unit 1104 used for determining respective display information of data objects, the respective display information including display models having three-dimensional display effects; a position and angle information determination unit 1106 used for determining respective positions of the respective display information of the data objects on the structure with the curved surface, and respective first angles formed with the curved surface; and a page generation unit 1108 used for generating a page of data object information based on the respective display information of the data objects, and information of the respective positions and the respective first angles.

In implementations, the apparatus 1100 may further include a page display unit 1110 used for providing the display information of the data objects for presentation in the three-dimensional scene based on the information of the respective positions and the respective first angles in response to receiving a request for displaying the page of the data object information.

In implementations, the structure with the curved surface is a structure with a rotating surface, and the display information of the data objects is distributed over an outer surface of the rotating surface.

In implementations, the structure with the rotating surface may include a ring-shaped rotating surface having a preset width.

In order to ensure a degree of exposure of the data object information at the same time when the three-dimensional display effects are ensured, a circumference of rotation may be an integral multiple of times of an arc length of a portion of a curved surface that is displayed by each screen of a terminal device.

In implementations, the circumference of rotation may be four times of the arc length of the portion of the curved surface that is displayed by each screen of the terminal device.

In implementations, the apparatus 1100 may further include a first camera object parameter adjustment unit 1112 used for adjusting positional and/or angular parameters of a camera object in the three-dimensional scene, to cause the width of the rotating surface to fill up the screen of the terminal device in a horizontal direction; and a second camera object parameter adjustment unit 1114 used for adjusting the positional and/or angular parameters of the camera object in the three-dimensional scene, to reserve a blank region above the three-dimensional scene in a vertical direction.

In implementations, the respective first angles formed between the respective display information with the curved surface at the respective positions are 90°.

In implementations, the display models may include a paper-style drawing board, a front face of the drawing board facing directly toward a direction of observation of a user.

In implementations, the apparatus 1100 may further include one or more processors 1116, an input/output (I/O) interface 1118, a network interface 1120, and memory 1122.

The memory 1122 may include a form of computer readable media such as a volatile memory, a random access memory (RAM) and/or a non-volatile memory, for example, a read-only memory (ROM) or a flash RAM. The memory 1122 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1122 may include program units 1124 and program data 1126. The program units 1124 may include one or more of the foregoing units.

Figure 12:
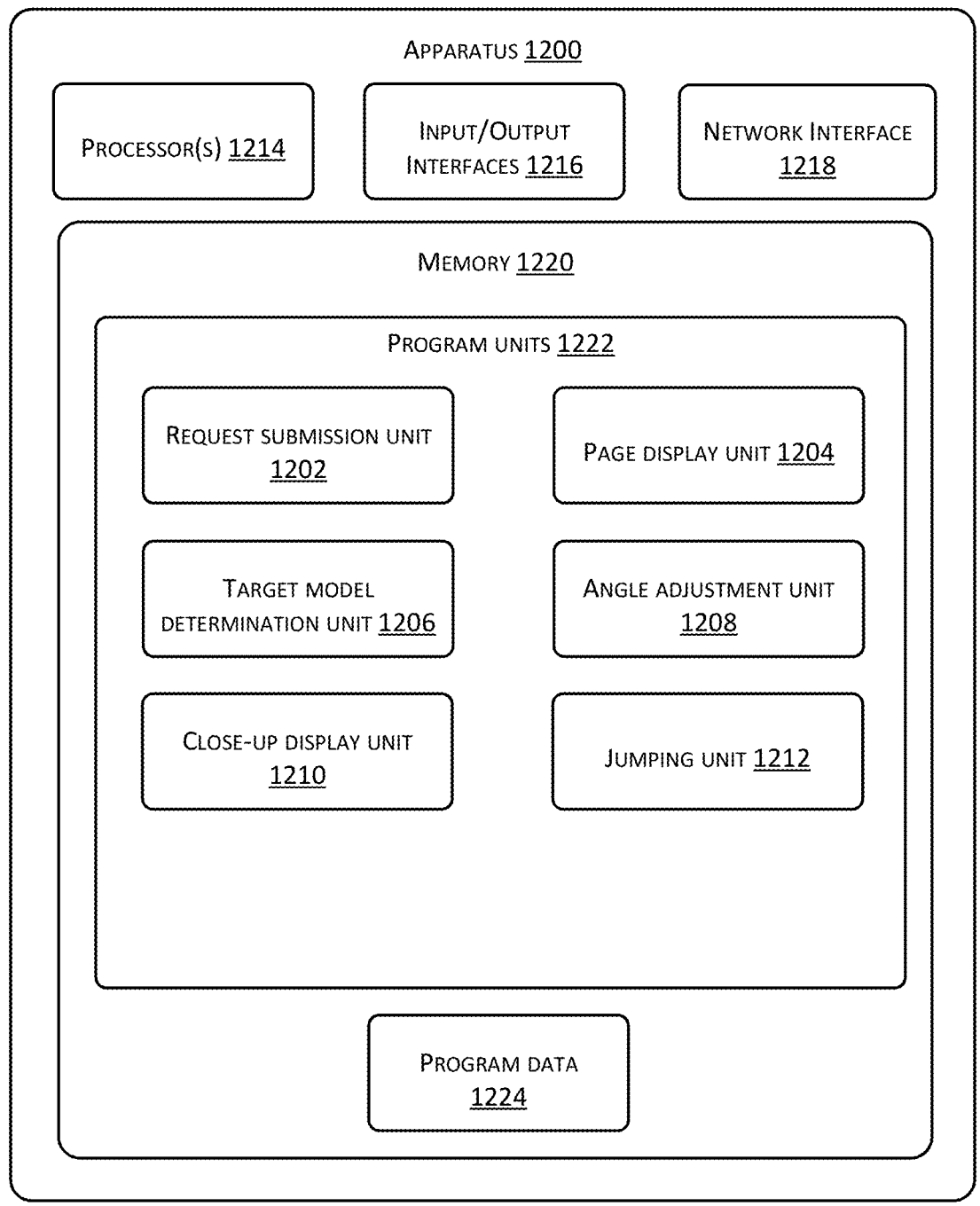
FIG. 12 shows a schematic diagram of a second apparatus in accordance with the embodiments of the present disclosure.

Corresponding to the second embodiment, the embodiments of the present disclosure further provide an apparatus 1200 of providing a page of data object information. Referring to FIG. 12, the apparatus 1200 is applied in a client, and may include a request submission unit 1202 used for sending a request for accessing a page of data object information to a server; a page display unit 1204 used for displaying the page of the data object information based on page data returned by the server, wherein the page of the data object information includes a three-dimensional scene, the three-dimensional scene is a structure with a curved surface, respective display information of data objects is displayed at preset positions on the curved surface, the respective display information possesses display models having three-dimensional display effects and forms first angles with the curved surface.

In implementations, the structure with the curved surface is a structure with a rotating surface, and the display information of the data objects is distributed over an outer surface of the rotating surface.

In implementations, the structure with the rotating surface may include a ring-shaped rotating surface having a preset width.

In implementations, a circumference of rotation may be an integral multiple of times of an arc length of a portion of a curved surface that is displayed by each screen of a terminal device.

In implementations, the circumference of rotation may be four times of the arc length of the portion of the curved surface that is displayed by each screen of the terminal device.

In implementations, the apparatus 1200 may further include a target model determination unit 1206 used for determining a target display model in a viewable region of a screen of a terminal device when the page of the data object information is displayed; and an angle adjustment unit 1208 used for adjusting a first angle between the target display model and the curved surface to change a second angle based on a second angle between the target display model and a direction of observation to change the second angle.

In implementations, the angle adjustment unit 1208 may further be used for adjusting the first angle to cause the second angle to fall within a preset data value range when the second angle falls outside the preset data value range.

From the perspective of an angular adjustment, the angle adjustment unit 1208 may further be used for performing a rotation operation on the display model according to a preset axis of rotation to adjust the first angle.

In implementations, the display models may include a first type of display model that is kept staying in the viewable region of the screen of the terminal device. The first type of display model moves in the three-dimensional scene according to a preset manner when the three-dimensional scene in the page is in a static state.

In implementations, the angle adjustment unit 1208 may further be used for adjusting the first angle between the target display model and the curved surface based on the second angle that is formed between the target display model and the direction of observation of a user, when the three-dimensional scene in the page is in a static state.

In another situation, the display models may include a second type of display model that enters into the viewable region of the screen of the terminal device as the three-dimensional scene moves. The second type of display model moves as the three-dimensional scene moves, and a position of the second type of display model in the three-dimensional scene remains unchanged.

In implementations, the angle adjustment unit 1208 may further be used for adjusting the first angle between the target display model and the curved surface based on the second angle that is formed between the target display model and the direction of observation of a user, during a movement of the three-dimensional scene.

In implementations, the three-dimensional scene moves as the user performs a sliding operation on the screen. Alternatively, the three-dimensional scene is triggered to move in response to a random browsing function, and stops at a position where a target display model is located.

With respect to the above second approach, the apparatus 1200 may further include a close-up display unit 1210 used for enlarging the three-dimensional scene after the three-dimensional scene stops moving, and providing an enlarged display of the target display model in the viewable region of the screen of the terminal device.

The target display model is determined based on personalized preference information of related users.

In implementations, the data objects may include store objects, and the display models are associated with store pages of the store objects. The apparatus 1200 may further include a jumping unit 1212 used for jumping into a store page of a target object for presentation in response to an operation being performed on a display model of the target object.

In implementations, the apparatus 1200 may further include one or more processors 1214, an input/output (I/O) interface 1216, a network interface 1218, and memory 1220.

The memory 1220 may include a form of computer readable media such as a volatile memory, a random access memory (RAM) and/or a non-volatile memory, for example, a read-only memory (ROM) or a flash RAM. The memory 1220 is an example of a computer readable media as described in the foregoing description.

In implementations, the memory 1220 may include program units 1222 and program data 1224. The program units 1222 may include one or more of the foregoing units.

Figure 13:
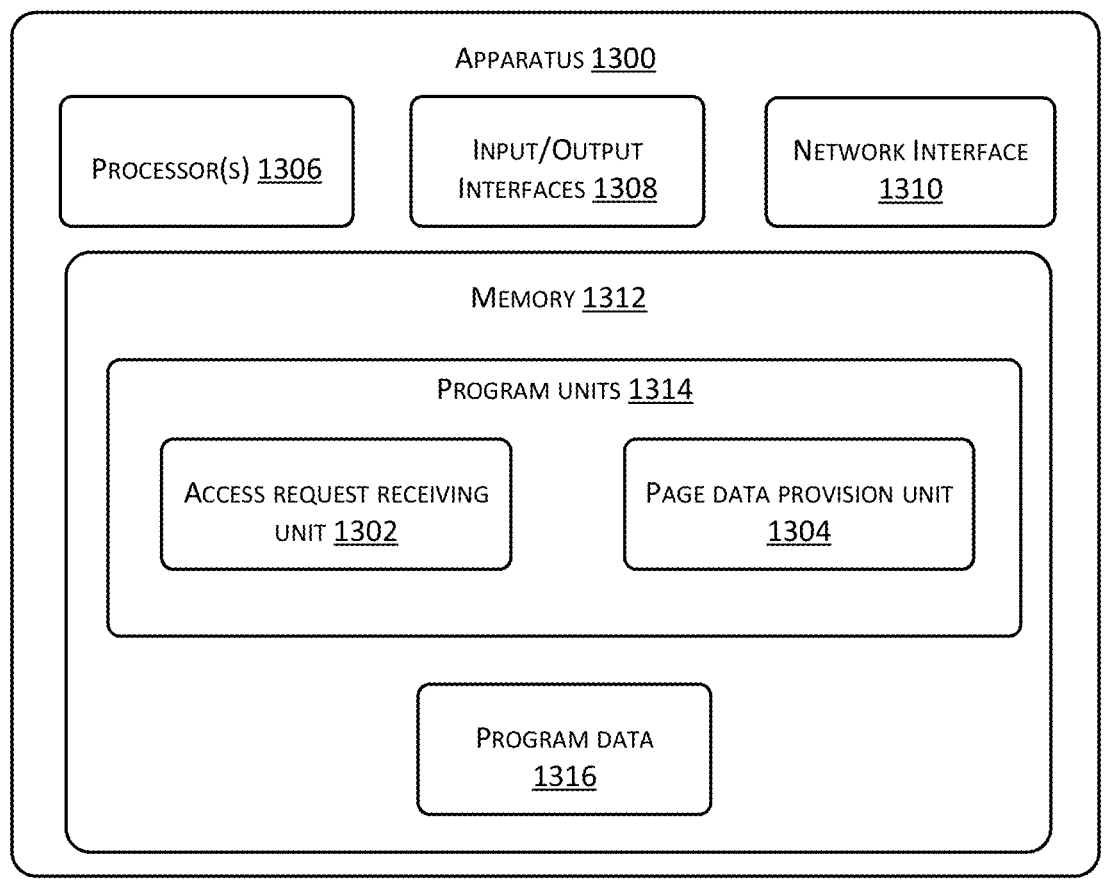
FIG. 13 shows a schematic diagram of a third apparatus in accordance with the embodiments of the present disclosure.

Corresponding to the third embodiment, the embodiments of the present disclosure further provide an apparatus 1300 of providing a page of data object information. Referring to FIG. 13, the apparatus 1300 is applied in a server, and may include an access request receiving unit 1302 used for receiving a request for accessing a page of data object information from a client; a page data provision unit 1304 used for providing the page of the data object information, wherein the page of the data object information includes a three-dimensional scene, the three-dimensional scene is a structure with a curved surface, display information of data objects is displayed at preset positions on the curved surface, the display information possesses display models having three-dimensional display effects and forms first angles with the curved surface.

In implementations, the apparatus 1300 may further include one or more processors 1306, an input/output (I/O) interface 1308, a network interface 1310, and memory 1312.

The memory 1312 may include a form of computer readable media such as a volatile memory, a random access memory (RAM) and/or a non-volatile memory, for example, a read-only memory (ROM) or a flash RAM. The memory 1312 is an example of a computer readable media as described in the foregoing description.

In implementations, the memory 1312 may include program units 1314 and program data 1316. The program units 1314 may include one or more of the foregoing units.

As can be seen from the description of the above embodiments, one skill in the art can clearly understand that the present disclosure can be implemented in a form of a software component with a necessary hardware platform. Based on this understanding, the essence of the technical solutions of the present disclosure or the portions that provide contributions to the existing technologies can be implemented in a form of a software product. This computer software product may be stored in storage media, such as ROM/RAM, a magnetic disk, an optical disk, etc., and includes instructions used for causing a computing device (which can be a personal computer, a mobile device, a server, or a networked device, etc.) to perform the method described in the embodiments or portions of the embodiments of the present disclosure.

The embodiments of the present disclosure are described in a progressive manner. The same or similar portions of the embodiments can be referenced with each other. Each embodiment places an emphasis differently from other embodiments. Because of being basically similar to the method embodiments, the systems or system embodiments are described relatively briefly, and can be referenced to related portions of the method embodiments. The foregoing systems and system embodiments are merely exemplary. Units that are described as separate components may or may not be physically separate. A component that is presented as a unit may or may not be a physical unit, i.e., may be located in a single location, or may be distributed among a plurality of network units. Some or all of the modules may be selected to implement the purpose of the solution of the present embodiments based on actual needs. One of ordinary skill in the art can understand and implement the present disclosure without making any creative effort.

Methods and apparatuses for providing a page of data object information are described in detail above. The present disclosure uses examples to describe the principles and embodiments of the present disclosure. The description of the foregoing embodiments is merely used to help understand the methods and concepts of the present disclosure. Based on the concepts of the present disclosure, one of ordinary skill in the art can make changes to the specific embodiments and application scopes. In short, content of the present specification should not be construed as limitations to the present disclosure.

The present disclosure may be further understood with clauses as follows.

Clause 1: A method of generating a page of data object information, comprising: creating a three-dimensional scene by a server, the three-dimensional scene being a structure with a curved surface; determining display information of data objects, the display information including display models having three-dimensional display effects; determining respective positions of the display information of the data objects on the curved surface and respective first angles formed with the curved surface; and generating a page of data object information based on the display information, and information of the respective positions and the respective first angles of the data objects.

Clause 2: The method of Clause 1, further comprising providing the display information of the data objects in the three-dimensional scene for display in response to receiving a request for displaying the page of the data object information.

Clause 3: The method of Clause 1, wherein the structure with the curved surface comprises a structure with a rotating surface, and the display information of the data object is distributed over an outer surface of the rotating surface.

Clause 4: The method of Clause 3, wherein the structure with the rotating surface comprises a ring-shaped rotating surface having a preset width.

Clause 5: The method of Clause 4, wherein a circumference of rotation is an integral multiple of times of an arc length of a curved surface portion that is displayed by each screen of a terminal device.

Clause 6: The method of Clause 5, wherein the circumference of rotation is four times of the arc length of the curved surface portion that is displayed by each screen of the terminal device.

Clause 7: The method of Clause 3, further comprising causing a width of the rotating surface to fill up a screen of a terminal device in a horizontal direction by adjusting positional and/or angular parameters of a camera object in the three-dimensional scene.

Clause 8: The method of Clause 3, further comprising reserving a blank region on top of the three-dimensional scene in a vertical direction by adjusting positional and/or angular parameters of a camera object in the three-dimensional scene.

Clause 9: The method of Clause 1, wherein the respective first angles formed between the display information and the curved surface at the respective positions are 90°.

Clause 10: The method of Clause 1, wherein the display models comprises a paper-style drawing board, a front face of the drawing board facing directly toward a direction of observation of a user.

Clause 11: A method of providing a page of data object information, comprising: sending a request for accessing a page of data object information from a client to a server; displaying the page of the data object information based on page data returned from the server, wherein the page of the data object information includes a three-dimensional scene, the three-dimensional scene is a structure with a curved surface, display information of data objects is displayed at preset positions on the curved surface, the display information possesses display models having three-dimensional display effects and forms first angles with the curved surface.

Clause 12: The method of Clause 11, wherein the structure with the curved surface comprises a structure with a rotating surface, and the display information of the data object is distributed over an outer surface of the rotating surface.

Clause 13: The method of Clause 12, wherein the structure with the rotating surface comprises a ring-shaped rotating surface having a preset width.

Clause 14: The method of Clause 3, wherein a circumference of rotation is an integral multiple of times of an arc length of a curved surface portion that is displayed by each screen of a terminal device.

Clause 15: The method of Clause 14, wherein the circumference of rotation is four times of the arc length of the curved surface portion that is displayed by each screen of the terminal device.

Clause 16: The method of Clause 11, further comprising: determining a target display model that enters into a viewable region of a screen of a terminal device when displaying the page of the data object information; and adjusting a first angle between the target display model and the curved surface, based on a second angle that is formed between the target display model and a direction of observation of a user, to change the second angle.

Clause 17: The method of Clause 16, wherein adjusting the first angle between the target display model and the curved surface comprises adjusting the first angle between the target display model and the curved surface to cause the second angle to fall within a preset data value range if the second angle falls outside the preset data value range.

Clause 18: The method of Clause 16, wherein adjusting the first angle comprises rotating the target display model according to a preset axis of rotation to adjust the first angle.

Clause 19: The method of Clause 16, wherein the display models comprise a first type of display model that is kept staying in the viewable region of the terminal device, and the first type of display model moves in the three-dimensional scene according to a preset manner when the three-dimensional scene of the page in a static state, and wherein adjusting the first angle between the target display model and the curved surface comprises adjusting the first angle between the target display model and the curved surface based on the second angle that is formed between the target display model and the direction of observation of the user when the three-dimensional scene of the page in the static state.

Clause 20: The method of Clause 16, wherein the display models comprise a second type of display model that enters into the viewable region of the terminal device as the three-dimensional scene moves, the second type of display model moving as the three-dimensional scene moves and a position of the second type of display model in the three-dimensional scene remaining unchanged, and wherein adjusting the first angle between the target display model and the curved surface comprises adjusting the first angle between the target display model and the curved surface based on the second angle that is formed between the target display model and the direction of observation of the user during a movement of the three-dimensional scene.

Clause 21: The method of Clause 20, wherein the three-dimensional scene moves as the user performs a sliding operation on the screen.

Clause 22: The method of Clause 20, wherein the three-dimensional scene is caused to move after a function of random browsing is triggered, and stops at a position where the target display model is located.

Clause 23: The method of Clause 22, further comprising enlarging the three-dimensional scene after the three-dimensional scene stops moving, and providing an enlarged display of the target display model in the viewable region of the screen of the terminal device.

Clause 24: The method of Clause 23, wherein the target display model is determined based on personalized preference information of related users.

Clause 25: The method of any one of Clauses 11-24, wherein the data objects comprise store objects, and the display models are associated with store pages of the store objects, and wherein the method further comprises jumping into a store page of a target store for display in response to a display model of the target object being manipulated.

Clause 26: A method of providing a page of data object information, comprising: receiving a request for accessing a page of data object information from a client by a server; and providing the page of the data object information, wherein the page of the data object information includes a three-dimensional scene, the three-dimensional scene is a structure with a curved surface, display information of data objects is displayed at preset positions on the curved surface, the display information possesses display models having three-dimensional display effects and forms first angles with the curved surface.

Clause 27: A page of data object information, wherein the page of the data object information includes a three-dimensional scene, the three-dimensional scene is a structure with a curved surface, display information of data objects is displayed at preset positions on the curved surface, the display information possesses display models having three-dimensional display effects and forms first angles with the curved surface.

Clause 28: The page of Clause 27, wherein the structure with the curved surface comprises a structure with a rotating surface, and the display information of the data object is distributed over an outer surface of the rotating surface.

Clause 29: The page of Clause 27, wherein the structure with the rotating surface comprises a ring-shaped rotating surface having a preset width.

Clause 30: The page of Clause 29, wherein a circumference of rotation is four times of an arc length of a curved surface portion that is displayed by each screen of a terminal device.

Clause 31: The page of Clause 27, wherein the first angles change as the page moves in a process of displaying the page.

Clause 32: An apparatus of generating a page of data object information, which is applied in a server, the apparatus comprising: a scene creation unit used for creating a three-dimensional scene, the three-dimensional scene being a structure with a curved surface; a display information determination unit used for determining display information of data objects, the display information including display models having three-dimensional display effects; a position and angle information determination unit used for determining respective positions of the display information of the data objects on the structure with the curved surface, and respective first angles formed with the curved surface; and a page generation unit used for generating a page of data object information based on the display information of the data objects, and information of the respective positions and the respective first angles.

Clause 33: An apparatus of providing a page of data object information, which is applied in a client, the apparatus comprising: a request submission unit used for sending a request for accessing a page of data object information to a server; a page display unit used for displaying the page of the data object information based on page data returned by the server, wherein the page of the data object information includes a three-dimensional scene, the three-dimensional scene is a structure with a curved surface, respective display information of data objects is displayed at preset positions on the curved surface, the respective display information possesses display models having three-dimensional display effects and forms first angles with the curved surface.

Clause 34: An apparatus of providing a page of data object information, which is applied in a server, the apparatus comprising an access request receiving unit used for receiving a request for accessing a page of data object information from a client; and a page data provision unit used for providing the page of the data object information, wherein the page of the data object information includes a three-dimensional scene, the three-dimensional scene is a structure with a curved surface, display information of data objects is displayed at preset positions on the curved surface, the display information possesses display models having three-dimensional display effects and forms first angles with the curved surface.

What is claimed is:

1. A method implemented by a server, the method comprising:
   creating a three-dimensional scene, the three-dimensional scene being a structure with a curved surface;
   determining display information of data objects, the display information including display models having three-dimensional display effects;
   determining respective positions of the display information of the data objects on the curved surface and respective first angles formed with the curved surface;
   generating a page of data object information based on the display information, and information of the respective positions and the respective first angles of the data objects;
   determining a target display model of the display models that enters into a viewable region of a screen when displaying the page of the data object information; and based on a second angle formed between the target display model and a direction of observation of a user, changing the second angle by adjusting a first angle of the target display model between the target display model and the curved surface.

2. The method of claim 1, further comprising providing the display information of the data objects in the three-dimensional scene for display in response to receiving a request for displaying the page of the data object information.

3. The method of claim 1, wherein the structure with the curved surface comprises a structure with a rotating surface having a preset width, and the display information of the data object is distributed over an outer surface of the rotating surface.

4. The method of claim 3, wherein a circumference of rotation is an integral multiple of times of an arc length of a curved surface portion that is displayed by each screen of a terminal device.

5. The method of claim 3, further comprising causing the width of the rotating surface to fill up a screen of a terminal device in a horizontal direction by adjusting positional and/or angular parameters of a camera object in the three-dimensional scene.

6. The method of claim 1, further comprising reserving a blank region on top of the three-dimensional scene by adjusting positional and/or angular parameters of a camera object in the three-dimensional scene.

7. The method of claim 1, wherein the display models comprise a paper-style drawing board, a front face of the drawing board facing directly toward a direction of observation of a user.

8. The method of claim 1, wherein adjusting the corresponding first angle includes adjusting the corresponding first angle to cause the second angle to fall within a preset data value range if the second angle falls outside the preset data value range.

9. One or more non-transitory computer-readable media storing executable instructions that, when executed by one or more processors of a client, cause the one or more processors to perform acts comprising:
sending a request for accessing a page of data object information to a server;
displaying the page of the data object information based on page data returned from the server, wherein:
the page of the data object information includes a three-dimensional scene,
the three-dimensional scene is a structure with a curved surface, display information of data objects is displayed at preset positions on the curved surface, and
the display information possesses display models, each display model having a corresponding three-dimensional display effect and forming a corresponding first angle with the curved surface;
determining a target display model of the display models that enters into a viewable region of a screen of a terminal device when displaying the page of the data object information; and
based on a second angle formed between the target display model and a direction of observation of a user, changing the second angle by adjusting a first angle of the target display model between the target display model and the curved surface.

10. The one or more non-transitory computer-readable media of claim 9, wherein the structure with the curved surface comprises a structure with a rotating surface, and the display information of the data object is distributed over an outer surface of the rotating surface.

11. The one or more non-transitory computer-readable media of claim 10, wherein the structure with the rotating surface comprises a ring-shaped rotating surface having a preset width.

12. The one or more non-transitory computer-readable media of claim 9, wherein a circumference of rotation of the ring-shaped rotating surface is an integral multiple of times of an arc length of a curved surface portion that is displayed by each screen of a terminal device.

13. The one or more non-transitory computer-readable media of claim 12, wherein the circumference of rotation is four times of the arc length of the curved surface portion that is displayed by each screen of the terminal device.

14. The one or more non-transitory computer-readable media of claim 9, wherein adjusting the first angle of the target display model between the target display model and the curved surface comprises:
adjusting the first angle to cause the second angle to fall within a preset data value range if the second angle falls outside the preset data value range.

15. The one or more non-transitory computer-readable media of claim 9, wherein adjusting the first angle of the target display model between the target display model and the curved surface comprises rotating the target display model according to a preset axis of rotation to adjust the first angle.

16. The one or more non-transitory computer-readable media of claim 9, wherein the display models comprise a first type of display model that is kept staying in the viewable region of the terminal device, and the first type of display model moves in the three-dimensional scene according to a preset manner when the three-dimensional scene of the page in a static state, and wherein adjusting the first angle of the target display model between the target display model and the curved surface comprises adjusting the first angle between the target display model and the curved surface based on the second angle that is formed between the target display model and the direction of observation of the user when the three-dimensional scene of the page in the static state.

17. The one or more non-transitory computer-readable media of claim 9, wherein the display models comprise a second type of display model that enters into the viewable region of the terminal device as the three-dimensional scene moves, the second type of display model moving as the three-dimensional scene moves and a position of the second type of display model in the three-dimensional scene remaining unchanged, and wherein adjusting the first angle of the target display model between the target display model and the curved surface comprises adjusting the first angle between the target display model and the curved surface based on the second angle that is formed between the target display model and the direction of observation of the user during a movement of the three-dimensional scene.

18. The one or more non-transitory computer-readable media of claim 17, wherein the three-dimensional scene is caused to move after a function of random browsing is triggered, and stop at a position where the target display model is located.

19. The one or more non-transitory computer-readable media of claim 18, the acts further comprising enlarging the three-dimensional scene after the three-dimensional scene stops moving, and providing an enlarged display of the target display model in the viewable region of the screen of the terminal device.

20. An apparatus comprising:
one or more processors; and
memory coupled to the one or more processors, the memory storing computer executable units, that when executed by the one or processors, perform associated operations, the computer executable units including:
  a request submission unit configured to send a request for accessing a page of data object information to a server;
  a page display unit configured to display the page of the data object information, wherein the page of the data object information includes a three-dimensional scene, the three-dimensional scene is a structure with a curved surface, display information of data objects is displayed at preset positions on the curved surface, the display information possesses display models, each display model having a corresponding three-dimensional display effect and forming a corresponding first angle with the curved surface;
  a target model determination unit configured to determine a target display model of the display models that enters into a viewable region of a screen of a terminal device when displaying the page of the data object information; and
  an angle adjustment unit configured to, based on a second angle formed between the target display model and a direction of observation of a user, change the second angle by adjusting a first angle of the target display model between the target display model and the curved surface.

* * * * *